United States Patent [19]

Tourbah et al.

[11] Patent Number: 5,367,562
[45] Date of Patent: Nov. 22, 1994

[54] METHOD AND DEVICE FOR RETURNING TO A NORMAL COMMUNICATION LINK AFTER USING A STANDBY LINK

[75] Inventors: Abdallah Tourbah, Chilly Mazarin; PAtrick Ruminy, Villiers sur Orge, both of France

[73] Assignee: Alcatel Cit, Paris, France

[21] Appl. No.: 203,766

[22] Filed: Mar. 1, 1994

Related U.S. Application Data

[63] Continuation of Ser. No. 684,741, Apr. 15, 1991, abandoned.

[30] Foreign Application Priority Data

Apr. 23, 1990 [FR] France .................. 90 05130

[51] Int. Cl.⁵ .................. H04M 1/24; H04M 11/00; H04M 7/00
[52] U.S. Cl. .......................... 379/93; 379/2; 379/26; 379/221
[58] Field of Search .............. 379/93, 96, 97, 98, 379/2, 32, 33, 27, 29, 221, 26, 37–40, 42–44, 46–51; 340/825.01; 370/16; 371/8.2; 375/38, 40

[56] References Cited

U.S. PATENT DOCUMENTS

| | | | |
|---|---|---|---|
| 4,365,248 | 12/1982 | Bargeton et al. | 340/825.01 |
| 4,442,518 | 4/1984 | Morimoto | 379/2 |
| 4,656,645 | 4/1987 | Kaneko | 340/825.01 |
| 4,680,776 | 7/1987 | Ikeuchi et al. | 340/825.01 |
| 4,862,492 | 8/1989 | Zwick | 379/32 |
| 4,887,290 | 12/1989 | Dop et al. | 379/40 |
| 4,910,763 | 3/1990 | Caron et al. | 379/98 |
| 4,969,178 | 11/1990 | Chen et al. | 379/33 |
| 5,010,550 | 4/1991 | Hirata | 340/825.1 |
| 5,120,021 | 6/1992 | Lebowitz | 379/40 |

FOREIGN PATENT DOCUMENTS

| | | | |
|---|---|---|---|
| 0032328 | 7/1981 | European Pat. Off. | H04B 1/74 |
| 0332792 | 9/1989 | European Pat. Off. | H04M 11/06 |
| 0119569 | 9/1981 | Japan | 379/2 |
| 0099452 | 5/1986 | Japan | 379/221 |
| 0161322 | 8/1979 | Netherlands | 379/2 |

OTHER PUBLICATIONS

IBM Technical Disclosure Bulletin, vol. 28, No. 8, Jan. 1986, pp. 3250–3250, New York, USA; "Adapter for connecting a multipoint modem network to the public switched network".
Patent Abstracts of Japan, vol. 9, No. 277 (E–355)[2000], Nov. 6, 1985; JP–A–60 119 147 (Fujitsu) Jun. 26, 1985.
Patent Abstracts of Japan, vol. 7, No. 170 (E–189)[1315], Jul. 27, 1983; & JP–A–58 77 336 (Tokyo Shibaura Denki), May 10, 1985.

*Primary Examiner*—Curtis Kuntz
*Assistant Examiner*—Jason Chan
*Attorney, Agent, or Firm*—Sughrue, Mion, Zinn, Macpeak & Seas

[57] ABSTRACT

A data communication system comprises two links between two terminal equipments, a standby link being used in the event of malfunctioning of a normal link. A method of returning to the normal link after using the standby link comprises, in parallel with transmission on the standby link, preliminary verification of the continuity of the normal link. The preliminary verification involves simultaneous transmission of a data signal by the terminal equipment initiating the continuity verification procedure, on the normal link and on the standby link, and detection by the other terminal equipment of the presence or absence of power on the normal link. This is done for each transmission medium of the normal link if the latter comprises separate media for each transmission direction.

16 Claims, 10 Drawing Sheets

METHOD AND DEVICE FOR RETURNING TO A NORMAL COMMUNICATION LINK AFTER USING A STANDBY LINK

This is a continuation of application Ser. No. 07/684,741 filed Apr. 15, 1991, now abandoned.

BACKGROUND OF THE INVENTION

1. Field of the Invention

The present invention concerns data communications.

It is more particularly concerned with data communication systems including a "normal" link for transmitting data between two terminal equipments, on which the data is normally transmitted, and a "standby" link used if the normal link fails.

2. Description of the Prior Art

The normal link is usually a leased line and the standby link is provided by the public switched telephone network. In each case, both these terms are used hereinafter without distinction.

There are various known methods for switching from the normal link to the standby link after malfunctioning of the normal link is detected.

The present invention is concerned with returning to the normal link after using the standby link.

Known methods for returning to the normal link involve, for example, regularly attempting transmission on the normal link, stopping transmission on the standby link at these times, or continuing transmission on the standby link while simultaneously verifying the continuity of the normal link using a specific signalling frequency transmitted over the latter.

The drawback of these methods is that they either disrupt the transmission of data at the tinge or this operation or that they do not verify the continuity of the normal link under its actual operating conditions. A further drawback is that they authorize the return to the normal link when the transmission quality on the normal link has not necessarily returned to normal.

An object of the present invention is a method whereby these drawbacks can be avoided.

SUMMARY OF THE INVENTION

In one aspect, the present invention consists in a method of returning to a normal link after using a standby link in a data communication system comprising two such links between two terminal equipments, the second link being used in the event of malfunctioning of the first, said method comprising, in parallel with transmission on the standby link, preliminary verification of the continuity of the normal link, in which method said preliminary verification involves simultaneous transmission of a data signal by one terminal equipment, referred to hereinafter as the terminal equipment initiating the continuity verification procedure, on the normal link and on the standby link, and detection by the other terminal equipment of the presence or absence of power on the normal link, for each transmission medium of the normal link if the latter comprises separate media for each transmission direction.

When continuity of the normal link is established by sensing the presence of power on said link during a first stage, a second stage preferably verifies the quality of transmission on said link without clearing down the standby link and at the initiative of one terminal equipment, referred to hereinafter as the terminal equipment initiating the quality verification procedure.

If good transmission quality on the normal link is not verified during the second stage, there is preferably a return to the first stage with transmission on the standby link which has not been cleared down simultaneously of a data signal by the terminal equipment initiating the continuity verification procedure on the normal link and on the standby link and detection by the other terminal equipment of the presence or absence of power on the normal link, after a time-delay.

In a second aspect, the present invention consists in a device for implementing a method of returning to a normal link after using a standby link in a data communication system comprising two such links between two terminal equipments, the second link being used in the event of malfunctioning of the first, said method comprising, in parallel with transmission on the standby link, preliminary verification of the continuity of the normal link, said method being characterized in that said preliminary verification involves simultaneous transmission of a data signal by one terminal equipment, referred to hereinafter as the terminal equipment initiating the continuity verification procedure, on the normal link and on the standby link, and detection by the other terminal equipment of the presence or absence of power on the normal link, for each transmission medium of the normal link if the latter comprises separate media for each transmission direction, said device comprising, in each of the terminal equipments, which includes a device for processing data transmitted and received by said terminal equipment:

a switching circuit adapted to connect transmit and receive ports of the data processing device of said terminal equipment to its transmit and receive ports on the normal link and/or the standby link, and a power sensor connected to the terminal equipment normal link receive port.

Other objects and characteristics of the present invention will emerge from the following description of embodiments of the present invention. The description refers specifically to the situation in which the normal link is a leased line and the standby link uses the public switched telephone network and in which the terminal equipments incorporating the devices for implementing the return method in accordance with the invention are modems. The description refers to the appended diagrammatic drawings.

DETAILED DESCRIPTION OF THE INVENTION

In either embodiment of the invention, the data signal transmitted simultaneously on the normal link and on the standby link by one of the terminal equipments during the preliminary verification of normal link continuity can be the same for both links or different.

FIGS. 1 through 8 schematically represent a data communication system comprising, for transmitting data between two data terminal equipments (DTE) TA and TB each having an associated modem MA and MB, a leased line LS on which the data is normally transmitted and a public switched telephone network line LRC on which the data is transmitted if transmission on the leased line LS is degraded or interrupted.

FIGS. 1 through 8 also show the respective data processing device 1A and 1B for each of the modems MA and MB and a respective switching and interface circuit 2A and 2B connected to the links LS and LRC. The circuits 2A and 2B separate the transmit and receive directions for each link and, at various stages of the method in accordance with the invention, connect the transmit and receive ports of the data processing device to the transmit and receive ports of the LS link and/or the LRC link.

In order to describe these embodiments of the method in accordance with the invention it is necessary to make an arbitrary distinction between the modems MA and MB.

One modem is referred to as the "call mode" modem (modem MA, for example) and takes the initiative for diverting traffic from the leased line LS to the standby LRC link, in particular for calling the other modem MB, referred to as the "switched telephone mode" modem.

Figure 1:
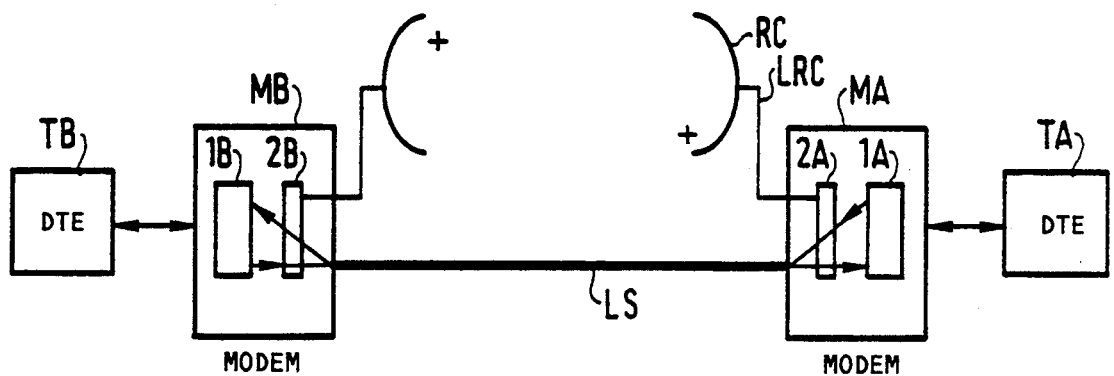
FIGS. 1 through 8 are diagrams showing various stages of a method in accordance with the invention in a situation where the leased line does not have separate media for each transmission direction.

FIG. 1 shows normal transmission on the leased line LS in which the interface and switching circuits 2A and 2B switch signals sent and received by the data processing device of each modem to the LS link which is represented by a thick line to show that it is being used at this time.

Figure 2:
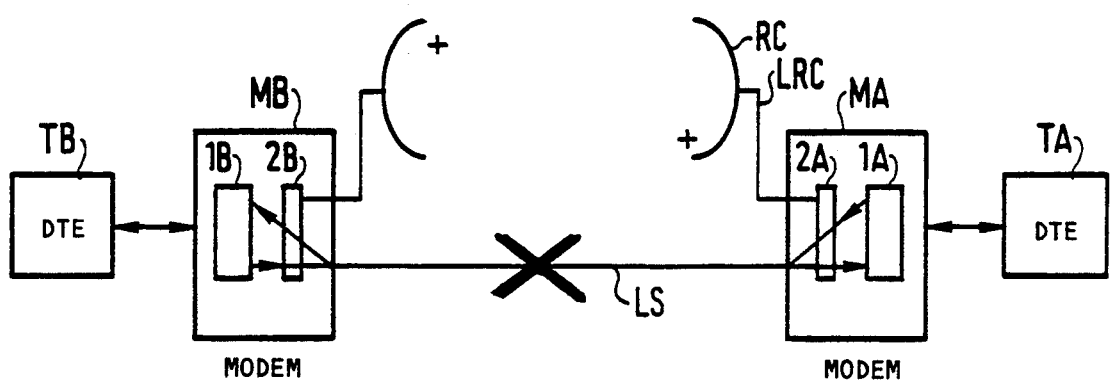
Figure 3:
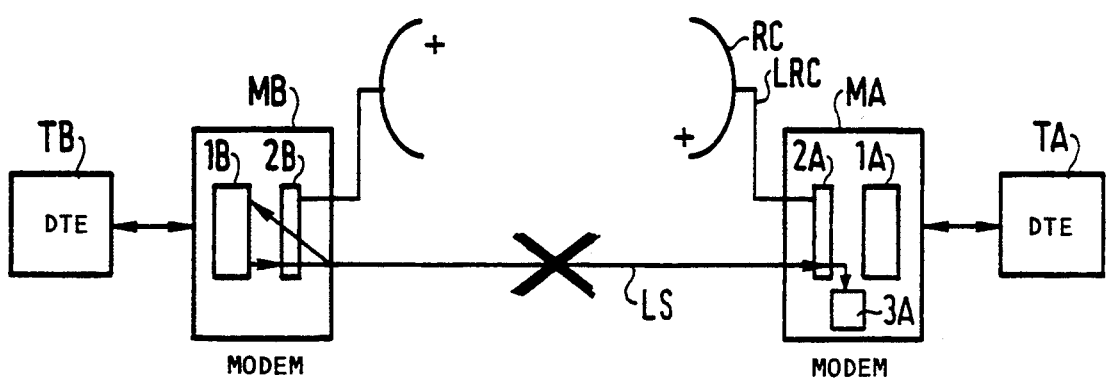

Deterioration or interruption of transmission on the LS link is shown in FIG. 2. The modems detect this malfunction in the conventional way and to determine whether the malfunction represents degradation or interruption of transmission (the reasons for this will be explained later) one of them, preferably the call mode modem, uses a power sensor 3A as shown in FIG. 3 to detect the presence of power at its receive port on the LS link, ceasing to transmit on this link in order to prevent the sensor responding to the energy of an echo signal. It decides that transmission is degraded if power is present or interrupted if there is no power present.

The call mode modem MA then attempts to connect to the receive mode modem MB via the public switched telephone network RC.

Figure 4:
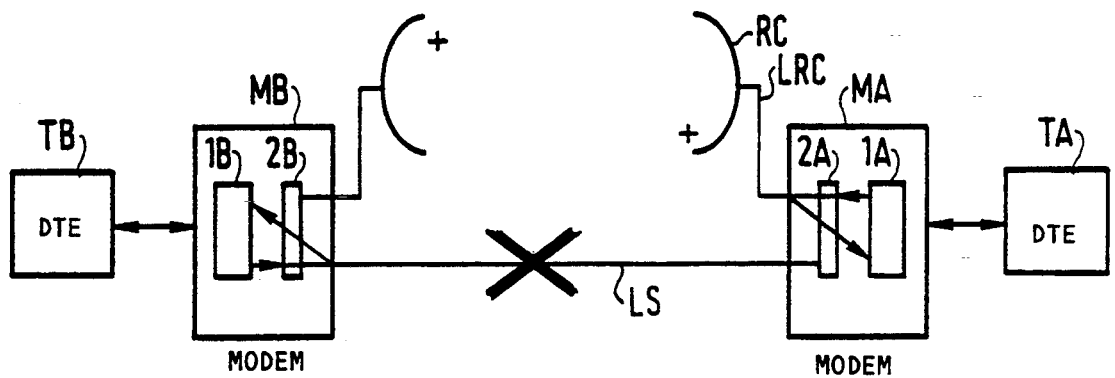

A conventional public switched telephone network call set-up phase then follows. This involves the call mode modem MA dialling up the number of the receive mode modem MB, during which the signals sent and received by the data processing device of this modem are switched to the LRC link, as shown in FIG. 4. The modem MB detects a call from the public switched telephone network RC and, having also detected a malfunction on the LS link (but without needing to determine whether this represents interruption or deterioration of transmission), on detecting the incoming call, connects the transmit and receive ports of its data processing device to its transmit and receive ports on the LRC link.

Figure 5:
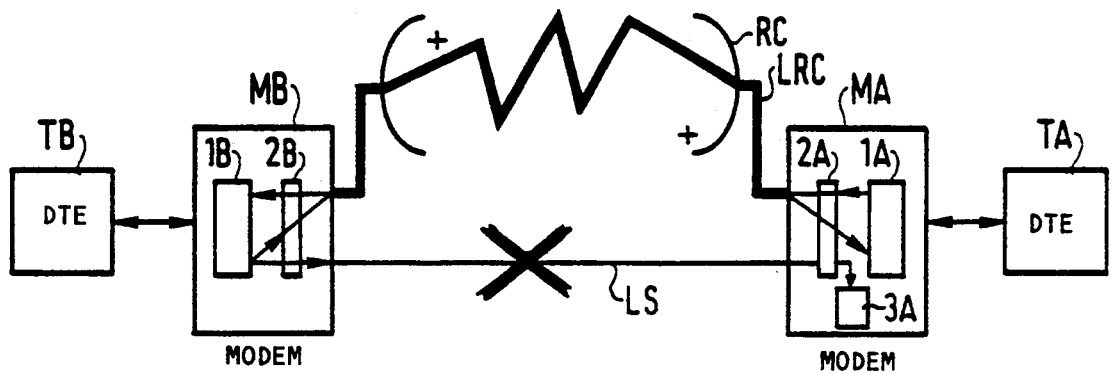

Transmission can then continue on the LRC link, as shown in FIG. 5 in which the LRC link is represented in thick line. For each modem, this transmission begins with the procedure to set up a call to the other modem.

One modem, referred to as the modem initiating the LS link continuity verification procedure, and preferably the receive mode modem, then sends a data signal simultaneously on the LRC link and on the LS link; the other modem, the call mode modem in this case, detects any power present at its receive port on the LS link by means of the power sensor 3A, as shown in FIG. 5.

If the malfunction initially detected on the LS link has been identified as due to interruption of transmission on this link, the power sensing is effected immediately.

If the malfunction initially detected on the LS link has been identified as due to deterioration of transmission quality on this link, power sensing is not effected until after a time-delay of, for example, 30 minutes.

Figure 6:
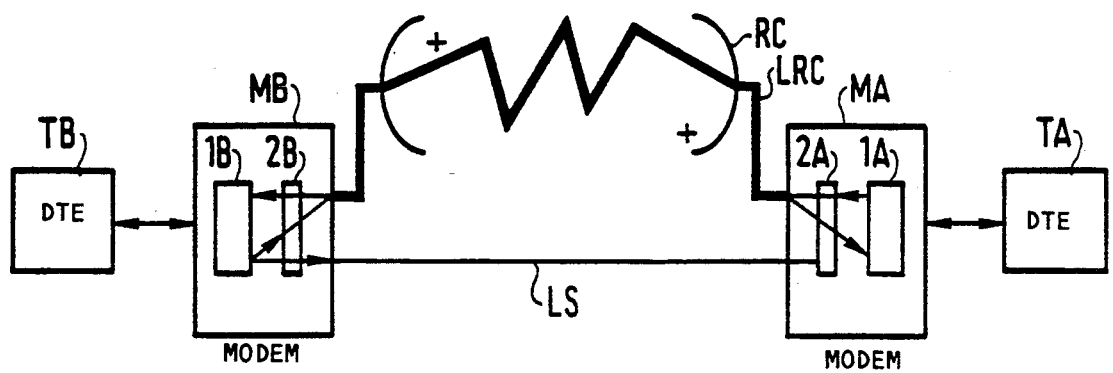

In either case the sensing of power as shown in FIG. 6 conditions progress to subsequent stages.

These will now be described.

Figure 7:
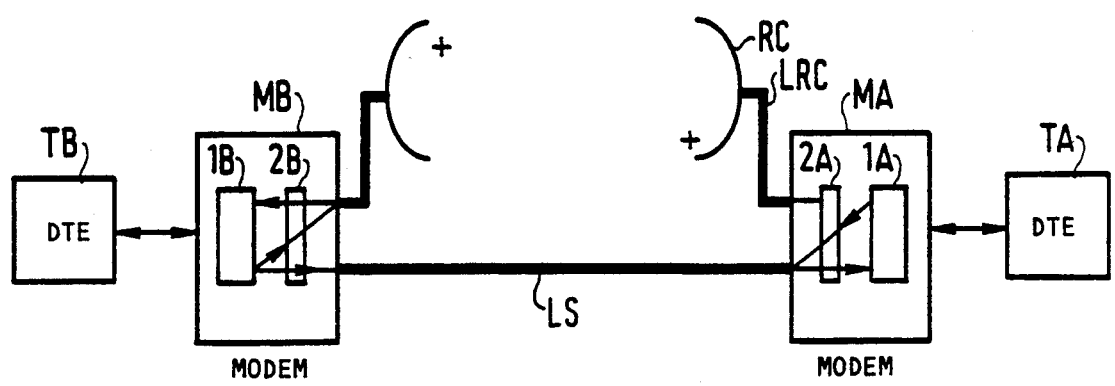

In FIG. 7 the receive mode modem MB is still connected as in FIG. 5 and in particular the receive port of its data processing device is still connected to the receive port on the LRC link. The call mode modem MA, which is the modem initiating the LS link transmission quality verification procedure, attempts to transmit a data signal on this link, in other words it goes to the state for transmitting a data signal over this link and initiates a call set-up procedure on the LS link, without clearing down the LRC link; this is symbolically represented in FIG. 7 by the use of a thick line for both links and by the fact that the transmit and receive ports of the data processing device of the call mode modem are connected to the transmit and receive ports of the modem on the LS link.

Figure 8:
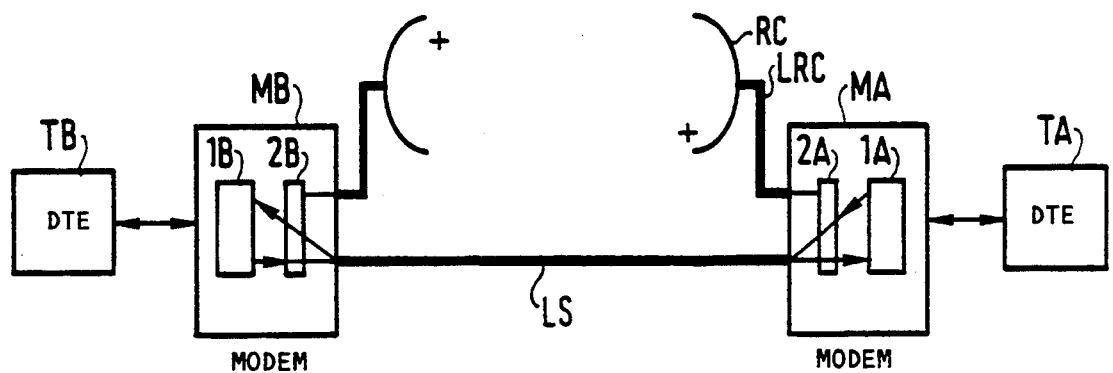

The receive mode modem, detecting the disappearance of its receive signal, in turn attempts to transmit on the LS link, without clearing down the standby LRC link; this is represented symbolically in FIG. 8 by the use of a thick line for both links and by the fact that the transmit and receive ports of the data processing devices of the two modems are respectively connected to their transmit and receive ports on the leased line.

If transmission quality is regarded as satisfactory following the call set-up procedure on the LS link, each modem then clears down the LRC link and the situation reverts to the initial situation as shown in FIG. 1.

If transmission quality is regarded as unsatisfactory, the modems return to the situation shown in FIG. 5 in which data is transmitted over the standby LRC link, following the call set-up procedure on this link, the receive mode modem continuing to transmit on the LS link, however, so that the call mode modem can sense power at its receive port on the LS link; however, this power sensing is not effected until the end of a time-delay of, for example, 30 minutes, following which the situation reverts to that shown in FIG. 7 if power is present or remains as shown in FIG. 5 if there is no power present, the power sensing being effected immediately.

Figure 9:
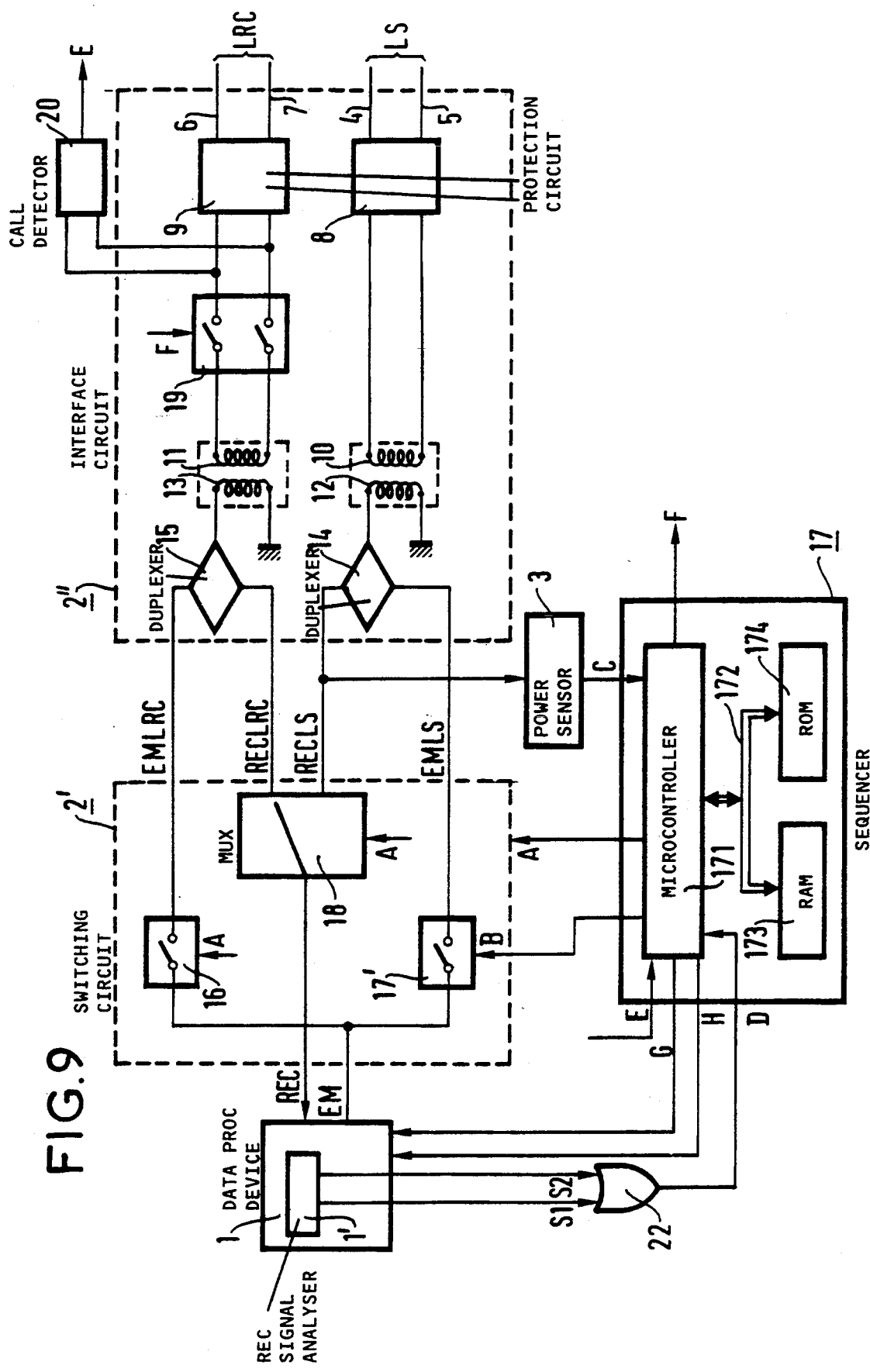
FIG. 9 is a block diagram of a device for implementing the method shown in FIGS. 1 through 8.

FIG. 9 shows a device for implementing the method as described above. The devices for the call mode and receive mode modems are identical.

This figure shows the data processing device 1, the interface and switching circuit 2, comprising a switching circuit 2' and an interface circuit 2", and the power sensor 3.

The transmit and receive ports of the data processing device are respectively denoted EM and REC.

In this first embodiment of the invention, each of the LS and LRC links is a two-wire link (4, 5 and 6, 7) not dedicated to transmission or to reception.

The interface circuit 2" includes for each of the LS and LRC links a respective protection circuit 8, 9 and a respective transformer with a first winding 10, 11 connected to the link wires and a second winding 12, 13 grounded at one end and having the other end connected to the input of a respective duplexer 14, 15 for splitting the transmit and receive ports on these links, respectively denoted EMLS and RECLS for the LS link and EMLRC and RECLRC for the LRC link.

The switching circuit 2' connects the EM and REC ports respectively to the EMLS and RECLS and/or EMLRC and RECLRC ports, as described above. To this end it includes a switch 16 with its input connected to the transmit port EM, its output connected to the EMLRC port and its control input receiving a control logic signal A from a sequencer 17 to be described later.

The switching circuit 2' also includes a switch 17' connected to the EM port and to the EMLS port and controlled by a logic signal B from the sequencer 17.

The switching circuit 2' also includes a multiplexer 18 having two data inputs respectively connected to the RECLS and RECLRC ports, an output constituting the REC port and a control input receiving the control signal A.

Connected between the winding 11 and the protection circuit 9 is a two-pole switch 19 controlled by a logic signal F from the sequencer 17 and the function of which is to set up or clear down the public switched telephone network link, as described above.

The signal on the LRC link between the switch 19 and the protection circuit 9 feeds a call detector 20 supplying a logic signal E to the sequencer 17.

The signal at the RECLS port feeds the power sensor 3 supplying a logic signal C to the sequencer 17.

The sequencer 17 also receives a logic signal D indicating whether reception of data by the modem in question is satisfactory or not. This signal is provided at the output of an "OR" gate 22 receiving two signals S1 and S2 produced by a received signal analyser 1' which is part of the data processing device 1 and one of which indicates deterioration of received signal quality or the absence of any such deterioration and the other of which indicates either that synchronization or resynchronization is impossible or that synchronization or resynchronization is effective, in the case of a transmission protocol based on exchanges between the two data terminals, one of them having the initiative for exchanges on the link used and being in this instance associated with the call mode modem.

Deterioration of signal quality is detected with reference to expected predetermined reference signals usually represented by a constellation of points in the Fresnel plane in the case of a modem combining phase modulation and amplitude modulation.

A received signal analyser of this kind is well known to those skilled in the art, being used also to control switching from the normal link to the standby link in the event of unsatisfactory reception on the normal link; for this reason it will not be further described here.

The power sensor 3 and the call detector 20 do not need to be described in detail either, as both are well-known to those skilled in the art.

The sequencer 17 outputs to the data processing device a signal G commanding it to start the procedure for setting up a call to the other modem and, in the case of the call mode modem only, a signal H commanding it to call the other modem in order to set up a link through the public switched telephone network.

The call mode modem dialling is transmitted from the data processing device 1 in the case of tone dialling, for example, this device storing in its memory the number for calling the receive mode modem.

The sequencer 17 shown in FIG. 9 includes a microcontroller 171 connected by address, data and control buses 172 to a random access memory 173 one function of which is to store temporarily the state of the signals A through H and to a read only memory 174 storing the operating sequence of the sequencer 17 in the form of a program of instructions to the microcontroller 171.

To describe the sequence generated by the sequencer with reference to FIGS. 10A and 10B respectively for the call mode modem and the receive mode modem, it will be assumed that the logic signals C through E have the binary value "1" in the following cases:

power sensed by the power detector 3 (C=1),
    data reception unsatisfactory (D=1),
    call detected (E=1),
    and that the binary value "1" of the logic signals A, B and F commands the following states:
    switch 16 open and multiplexer 18 connecting REC port to RECLS port (A=1),
    switch 17' closed (B=1),
    switch 19 closed (F=1).

It will also be assumed that the signals G and H respectively indicate, by a transition from the "0" state to the "1" state followed by a transition from the "0" state to the "0" state, a command to start the procedure to set up a call to the other modem and a command to call the other modem (the signal H being used only in the call mode modem).

Figure 10A:
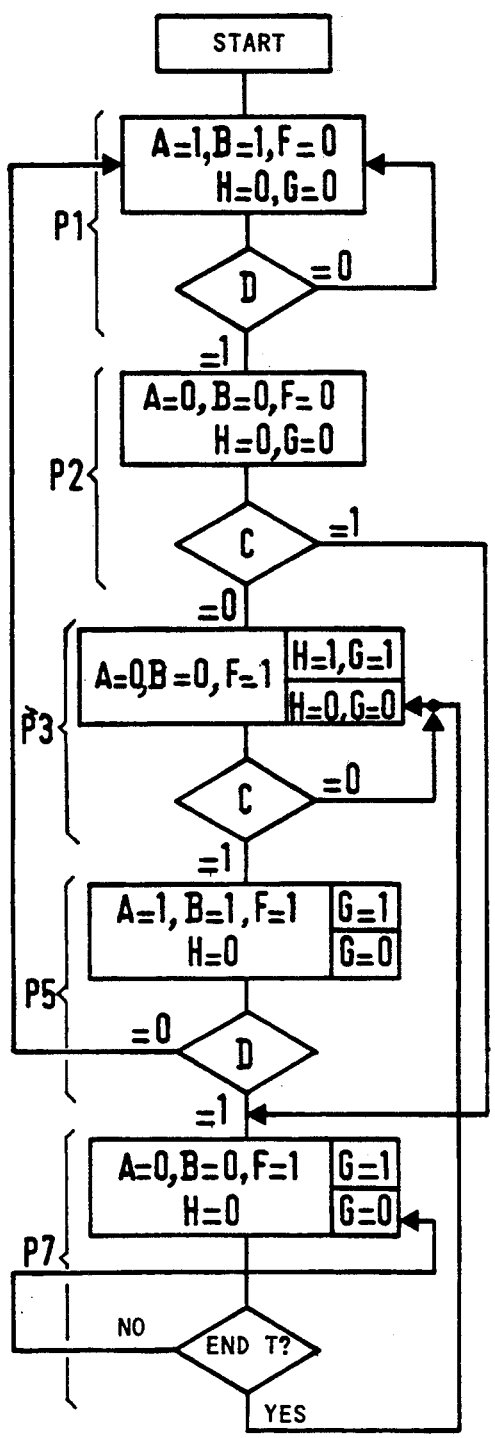
FIGS. 10A and 10B are flowcharts showing the implementation of various stages of the method shown in FIGS. 1 through 8, by a device as shown in FIG. 9, respectively in a "call mode" modem and in a "receive mode" modem.
Figure 10B:
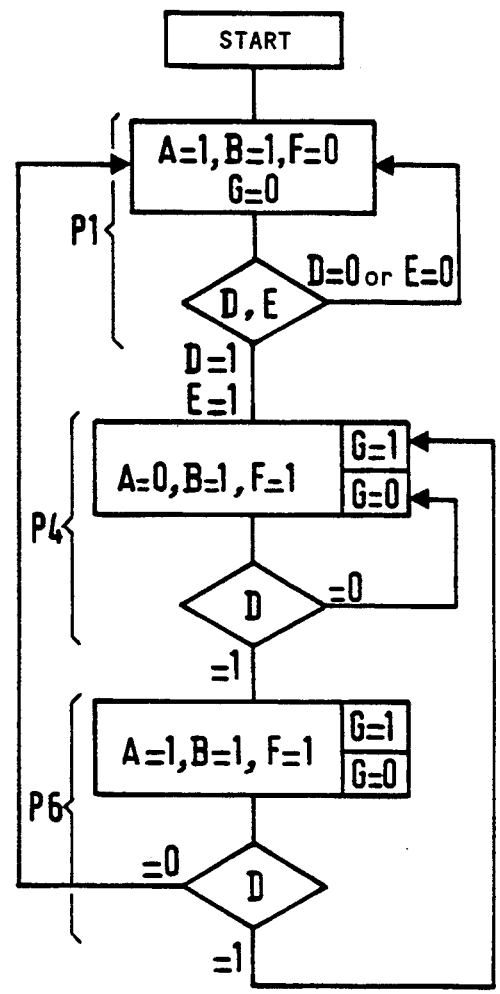

In FIGS. 10A and 10B, P1 is the initial phase in which each modem transmits normally on the LS link, characterized by the following states of the control logic signals: A=1, B=1, F=0 and G=0 for both the call mode modem and the receive mode modem, and by the state 8=0 for the call mode modem. The phase P1 includes a continuous test of the state of signal D, this test causing the initial phase P1 to be continued for as long as the state of this signal is the "0" state.

The second phase P2 concerns the call mode modem and starts with detection of the control signal D at "1". It is characterized by the states A=0, B=0, F=0, G=0 and H=0 for the call mode modem. It represents cessation of transmission by this modem and detection by the power sensor 3 of this modem of power present on the leased line.

If the absence of power is sensed, as indicated by a "0" state of the signal C for the call mode modem, representing an interruption of transmission on the leased line, this modem changes from phase P2 to a phase P3 characterized by the states A=0, B=0 and F=1 and by a change to the state "1" followed by a return to the state "0" of the signals G and H, then in the receive mode modem, on detecting a "1" state of the E control signal of this modem, caused by the dialling sent by the call mode modem during phase P3, a change from phase P1 to a phase P4 characterized by the states A=0, B=1 and F=1 and by a change to the "1" state followed by a return to the "0" state of the signal G, during which both modems transmit on the LRC link, the receive mode modem also transmitting its data signal on the LS link.

If the call mode modem senses power during phase 3, indicated by a "1" state of the signal C for this modem, the call mode modem goes from phase P3 to a phase P5 characterized by the states A=1, B=1, F=1 and H=0 and by a change to the "1" state followed by a return to the "0" state of the signal G, during which the call mode modem attempts transmission on the leased line without clearing down the LRC link.

If the receive mode modem detects unsatisfactory reception during phase P4 (in this instance total absence of received signals because the call mode modem is sending on the leased line but the receive mode modem has its REC port connected to the RECLRC port), indicated by the state of signal D changing to "1" at the receive mode modem, this modem goes from the P4 phase to a phase P6 characterized by the states A=1, B=1 and F=1 and by a change of signal G to the state "1" followed by a return to the state "0", during which the receive mode modem attempts in turn to transmit on the leased line without clearing down the LRC link.

If a "0" state of the signal D is detected during phase P5 for the call mode modem or during phase P6 for the receive mode modem, each modem then returns to the initial phase P1 and transmits on the leased line.

On detecting state "1" of its signal D during phase P6, the receive mode modem returns to the state A=0, B=1, F=1 and G=1 of phase P4 and on detecting a "1" state of its signal D during phase P5 the call mode modem goes to a phase P7 characterized by the same states A=0, B=0, F=1, H=0 and G=1 and then A=0, B=0, F=1, H=0 and G=0 as the P3 phase, to the state A=0, B0, F=1, H=0 and G=0 of which (the call set-up procedure with the other modem over the LRC link having been completed already) it then returns automatically after a predetermined time-delay T of, for example, 30 minutes.

If the time-delay T does not run out, the call mode modem remains in the P7 phase state A=0, B=0, F=1, H=0 and G=0.

If a "1" state of the signal C is detected in the call mode modem during phase P2, the modem goes directly to phase P7.

There will now be described with reference to FIGS. 11 through 19 a method which is a second embodiment of the invention and applies to the situation in which the leased line has separate transmission media for the transmit and receive directions.

In these figures the same reference letters and numbers are used for parts identical to parts previously described. The stages of this method similar to those already described will not be described again in detail.

The LS link is now replaced by two links, an LSA link for transmission from the call mode modem to the receive mode modem and an LSB link for transmission from the receive mode modem to the call mode modem.

Figure 11:
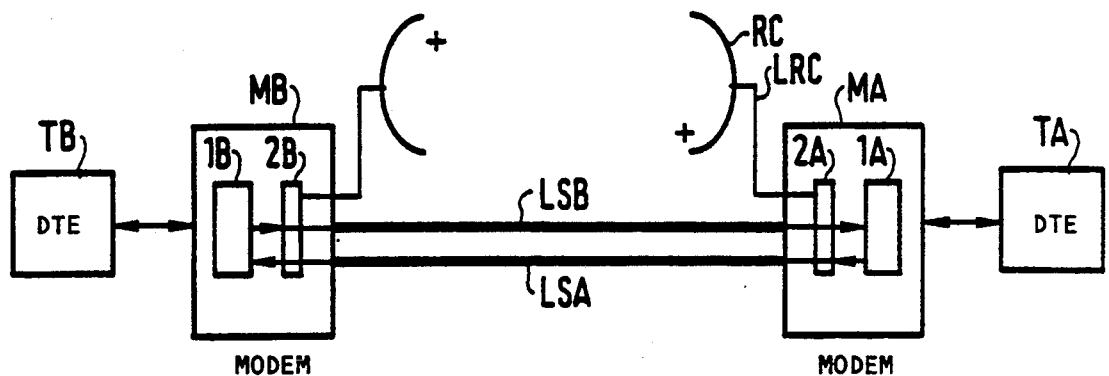
FIGS. 11 through 19 are diagrams showing various stages of a method in accordance with the invention in a situation where the leased line has separate media for each transmission direction.

Apart from this difference, FIG. 11 is identical to FIG. 1.

Figure 12:
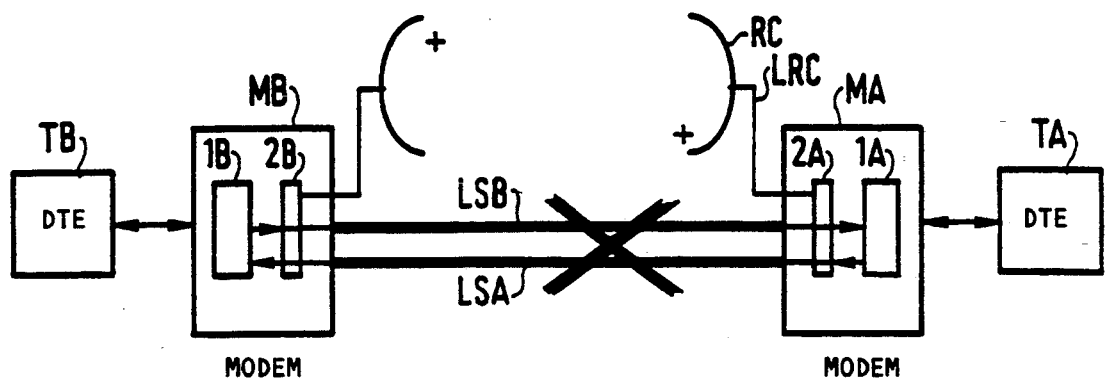

FIG. 12 shows deterioration or interruption of transmission on the LS link. Note that this deterioration or interruption of transmission can affect the LSA link and/or LSB link.

Figure 13:
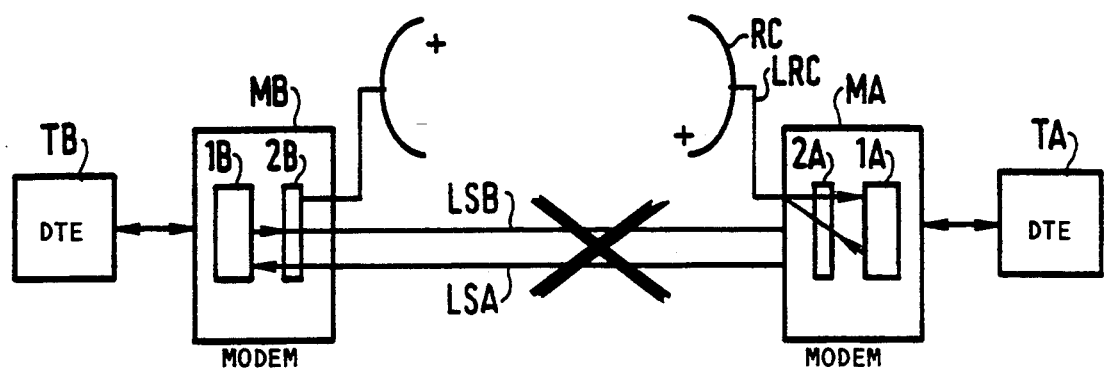

FIG. 13 shows the call mode modem dialling phase, which is similar to that shown in FIG. 4.

The next stage verifies the continuity of the leased line and is carried out when the receive mode modem has detected the call and both modems have carried out the procedure to set up a call on the LRC link.

Figure 14:
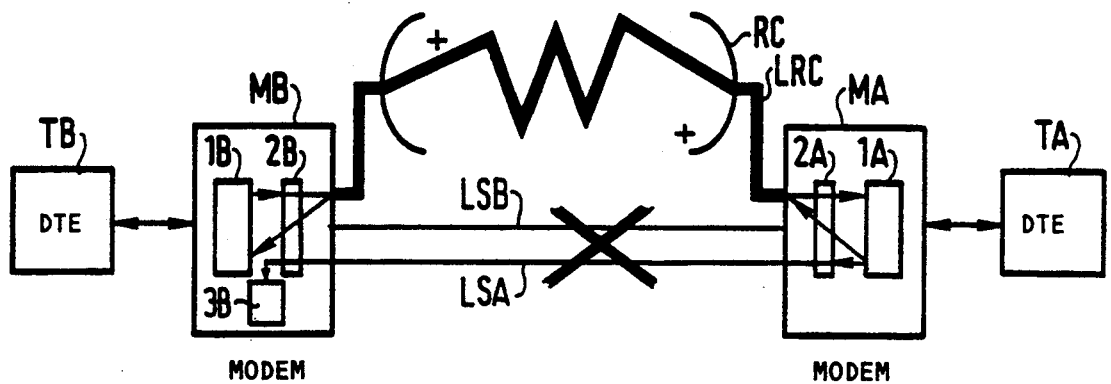
Figure 15:
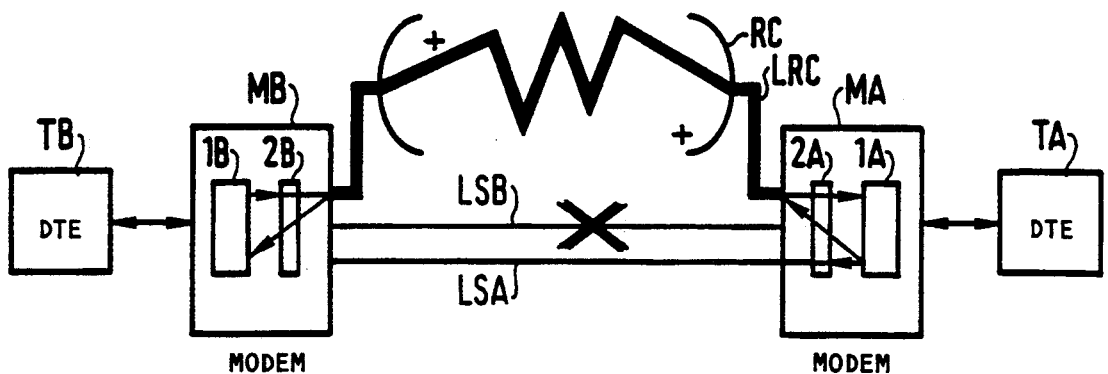

FIG. 14 shows this stage and differs from FIG. 5 in that it is now the call mode modem which simultaneously sends a data signal on the LRC link and on the LS link (the LSA link in this case) and the receive mode modem which senses power on this link, FIG. 15 being a schematic representation of the presence of power on the LSA link.

Figure 16:
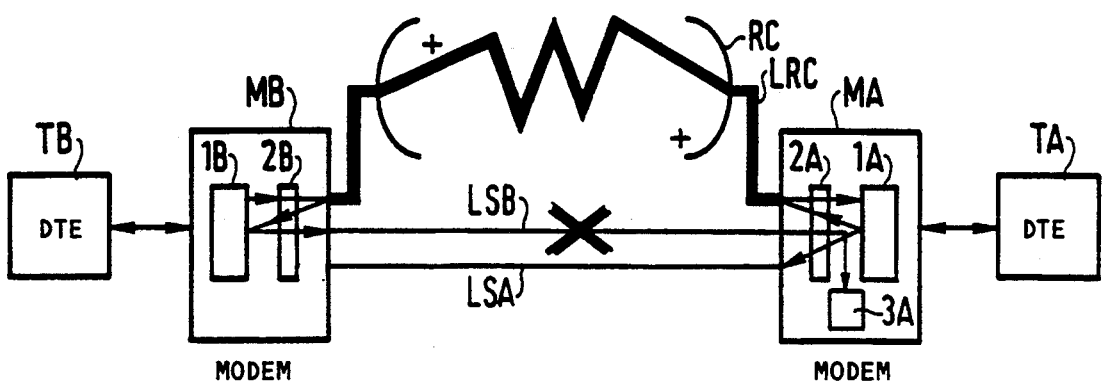
Figure 17:
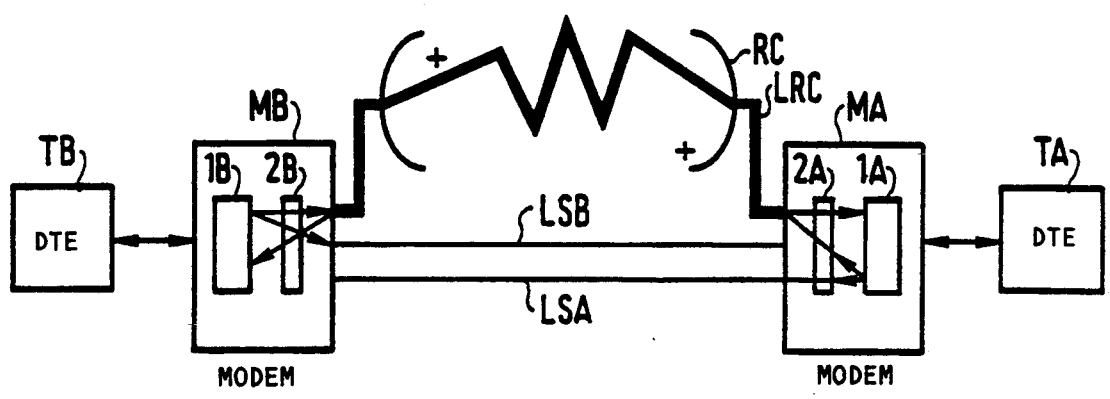

The method incorporates a new stage, shown in FIG. 16, in which following detection of LSA link continuity by the receive mode modem, the latter sends a data signal simultaneously on the LRC link and on the LS link (the LSB link in this instance), and the call mode modem senses the presence of power on this link, FIG. 17 giving a symbolic representation of the presence of power on the LSB link.

Figure 18:
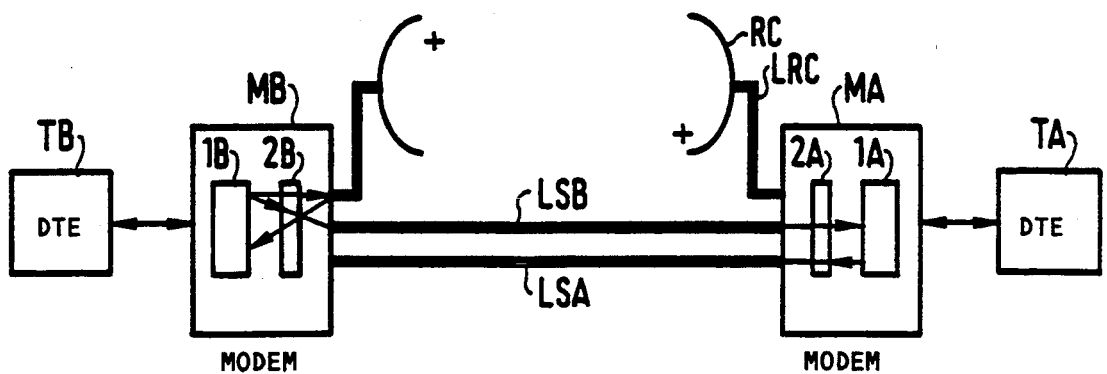

FIG. 18 shows the next stage in which, following detection of LSB link continuity, the call mode modem attempts to transmit on the LS link, in other words it goes to the condition for transmitting a data signal on this link and initiates a call set-up procedure on this link, without clearing down the LRC link.

Figure 19:
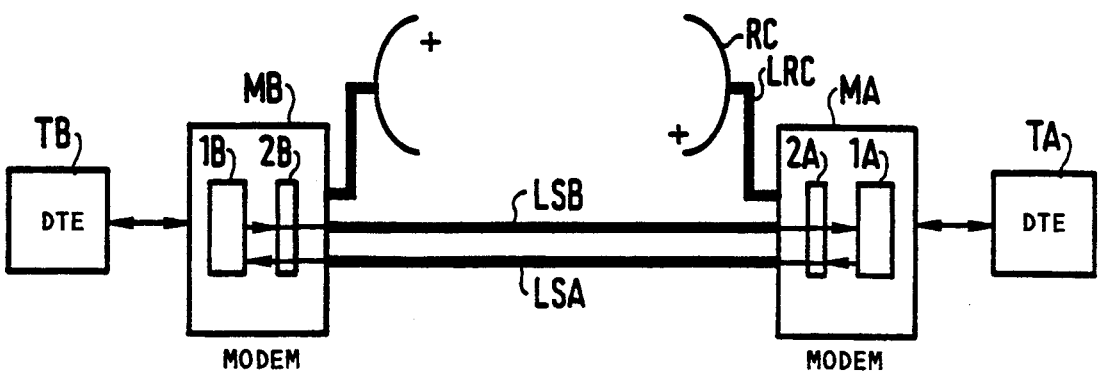

Having its receive port still connected to the LRC link, the receive mode modem registers the disappearance of its receive signal which causes the change to the next stage, shown in FIG. 19, in which the receive mode modem attempts in turn to transmit on the LS link.

When both modems determine that reception is satisfactory they both clear down the LRC link and return to the initial state shown in FIG. 11.

If reception is not satisfactory, the situation reverts to that of FIG. 14 involving transmission on the LRC link, which is not cleared down, simultaneous transmission of a data signal by the call mode modem on the LSA link and sensing of the presence or absence of received power by the receive mode modem after a time-delay of, for example, 30 minutes.

As previously, the situation then reverts to that shown in FIG. 17 if power is present or to that shown in FIG. 14 otherwise, the power sensing in FIG. 14 being immediate.

Figure 20:
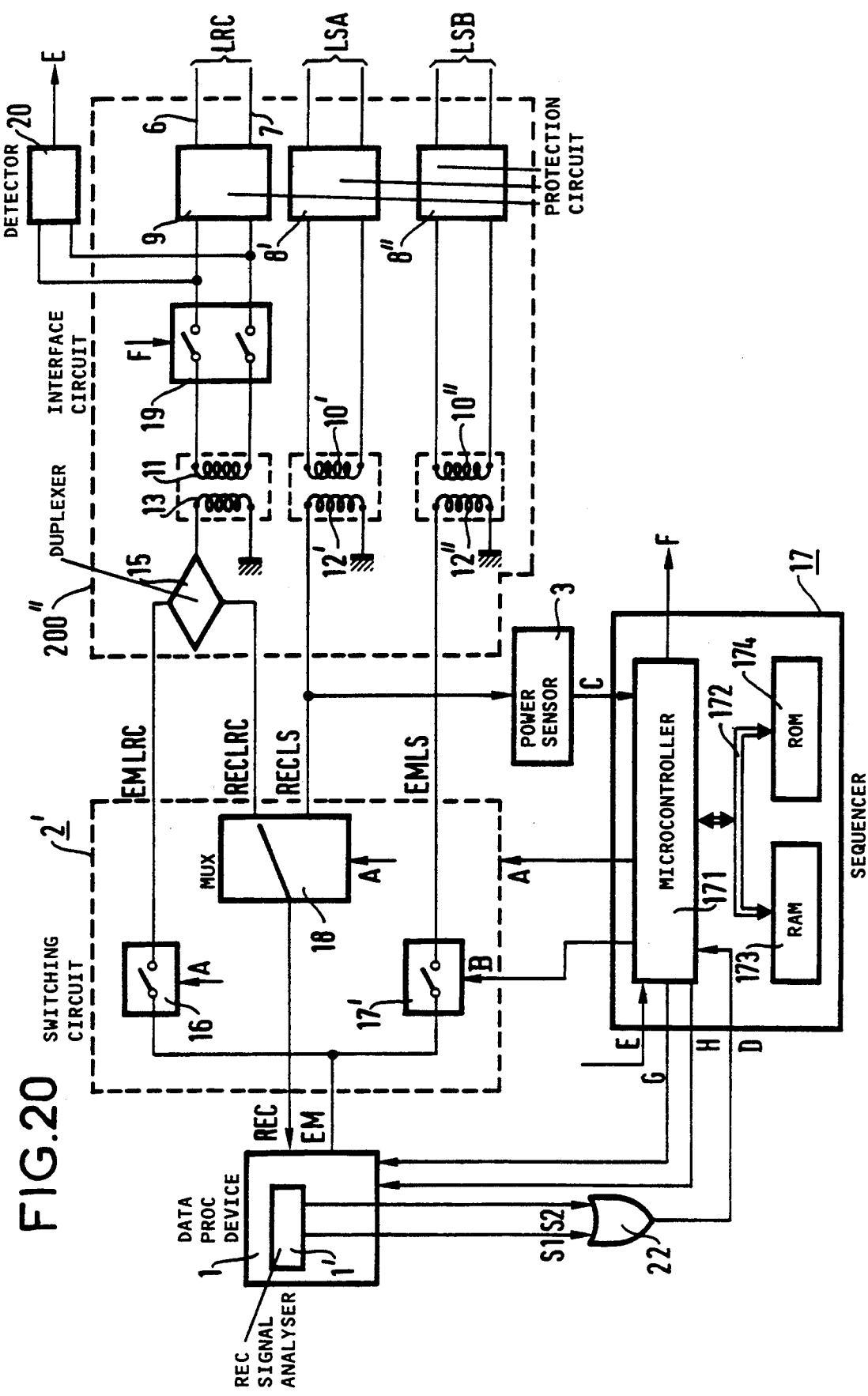
FIG. 20 is a block diagram of a device for implementing the method shown in FIGS. 11 through 19.

A device for implementing the method represented in FIGS. 11 through 19 is shown in FIG. 20.

The devices for the call mode modem and for the receive mode modem are identical. The same reference numbers and letters are used in FIG. 20 for parts identical to parts shown in FIG. 9.

The device is identical to the FIG. 9 device except for the leased line interface units within the interface circuit 200' for which two protection circuits 8' and 8" are now provided, each associated with a respective one of the links LSA and LSB, for example, together with two transformers each associated with one of the links with windings 10' and 12' for the LSA link and 10" and 12" for the LSB link. No duplexer is required in this embodiment.

Figure 21A:
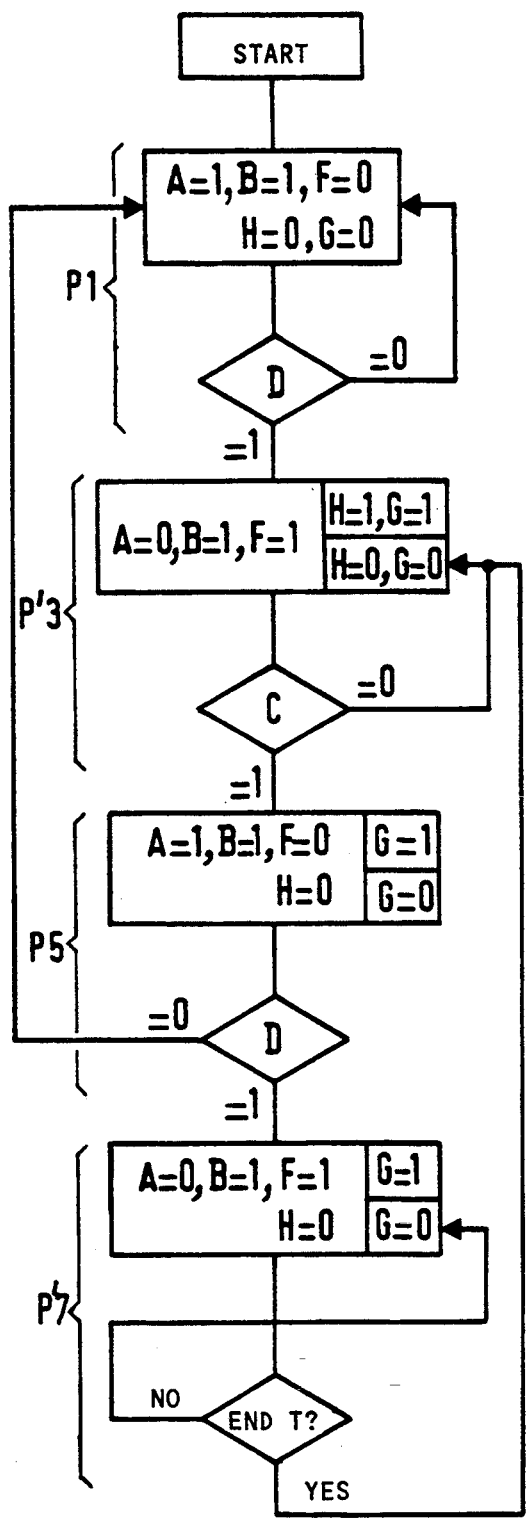
FIGS. 21A and 21B are flowcharts showing the implementation of various stages of the method shown in FIGS. 11 through 19, by a device as shown in FIG. 20, respectively in a "call mode" modem and in a "receive mode" modem.
Figure 21B:
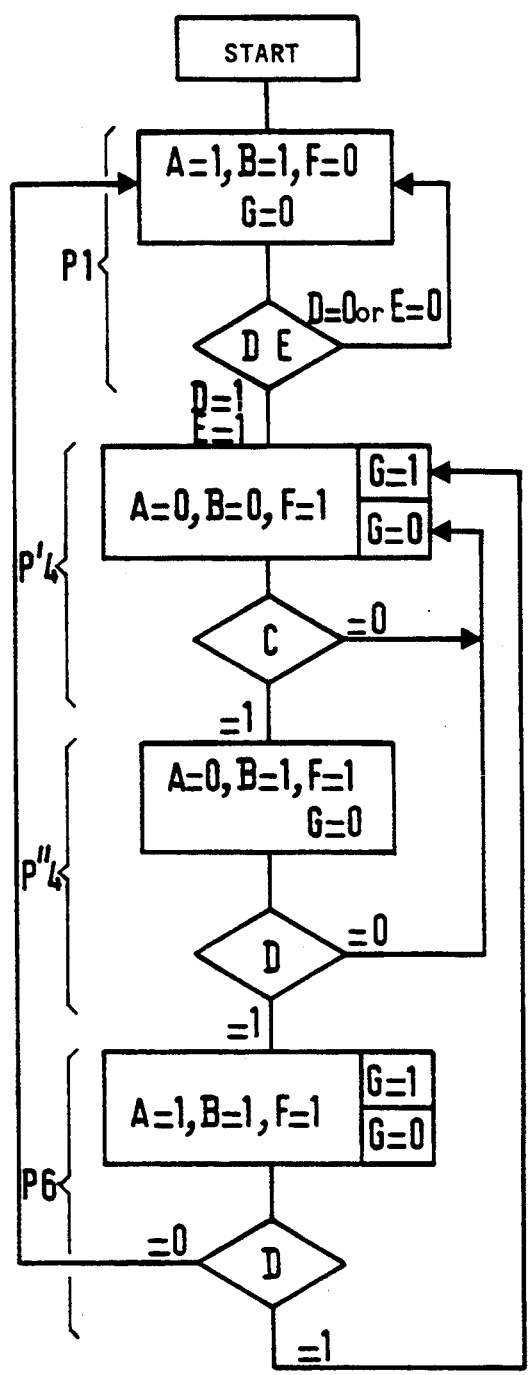

FIGS. 21A and 21B show the operating sequence of the sequencer 17 respectively for the call mode modem and for the receive mode modem. These figures use the same reference numbers and letters as FIGS. 10A and 10B to denote analogous stages, which will not be described again in detail.

The sequence differs from that shown in FIGS. 10A and 10B in that, for the call mode modem the phase P1 is followed by a phase P′3 characterized by the states A=0, B=1, F=1, H=1 and G=1 and then by the states A=0, B=1, F=1, H=0 and G=0 in which this modem carries out the procedure for setting up a call to the other modem, sends a data signal simultaneously on the LRC link and on the LS link, and receives on the LRC link.

The phase P4 in which the receive mode modem transmits on the LRC link is replaced by a phase P′4 characterized by the states A=0, B=0, F=1 and G=1 and then A=0, B=0, F=1 and G=0 in which the receive mode modem carries out the procedure for setting up a call to the other modem, transmits on the LRC link only and senses the presence or absence of power on the LS link.

Detection of power on the LS link by the receive mode modem during phase P′4, in other words detection of a "1" state of the C signal of this modem, results in simultaneous transmission of a data signal by this modem on the LRC link and on the LS link, with reception on the LRC link, this phase being denoted P″4 and being characterized by the states A=0, B=1, F=1 and G=0.

Detection of power on the LS link by the call mode modem, which is then in phase P′3, in other words detection of a "1" state of the signal C of this modem, leads to this modem attempting to return to the LS link, without clearing down the LRC link; this phase is similar to the phase P5 in FIG. 10A.

The next phase P6, during which the receive mode modem attempts in turn to transmit on the LS link without clearing down the LRC link, is also similar to that already described with reference to FIG. 10B.

In the event of unsatisfactory reception by the call mode modem during phase P5, the next phase for this modem (P′7) is identical to the phase P′3 (in the same way as, in FIG. 10A, the phase P7 was identical to the phase P3).

The change from phase P′7 to the state A=0, B=1, F=1, H=0 and G=0 of phase P′3 occurs, in a similar way to that described for FIG. 10A, after a time-delay T of, for example, 30 minutes. If this time-delay does not run out, the state A=0, B=1, F=1, H=0 and G=0 of phase P′7 is continued.

In the event of unsatisfactory reception by the receive mode modem during phase P6, this modem reverts to the state A=0, B=0, F=1 and G=1 of the P′4 phase.

In the event of unsatisfactory reception by the call mode modem in the P5 phase and by the receive mode modem in the P6 phase, both modems revert to the P1 phase.

There is claimed:

1. A method of returning to a normal link after using a standby link in a data communication system comprising said normal link and standby link between two terminal equipments, said normal link comprising at least one transmission medium and the standby link being used in the event of malfunctioning of the normal link, said method comprising, in case of malfunctioning of the normal link, and once the standby link is used for transmitting data signals to be transmitted between said two terminal equipments, simultaneously transmitting a data signal by one of said two terminal equipments, referred to hereinafter as the terminal equipment initiating the continuity verification procedure, on the normal link and on the standby link, and detecting by the other terminal equipment the presence or absence of power on the normal link to preliminarily verify the continuity of the normal link.

2. A method according to claim 1 wherein, when continuity of the normal link is established by sensing the presence of power on said normal link during a first stage, said method further comprises the step of verifying the quality of transmission on said normal link in a second stage without clearing down the standby link and at the initiative of one of said two terminal equipments, referred to hereinafter as the terminal equipment initiating the quality verification procedure.

3. A method according to claim 2 wherein, if satisfactory transmission quality on the normal link is not verified during the second stage, there is a return to the first stage, after a time-delay.

4. A method according to claim 1 comprising, in parallel with the detection of a transmission fault on the normal link, detecting whether the transmission fault comprises interruption of transmission on said normal link or deterioration of transmission quality on said normal link.

5. A method according to claim 4 wherein, in the event that the transmission fault is a deterioration of transmission quality, the presence of power on the normal link is sensed only after a time-delay.

6. A method according to claim 2, wherein said normal link does not include separate media for each transmission direction, and said terminal equipment initiating the quality verification procedure is other than said terminal equipment initiating the continuity verification procedure.

7. A method according to claim 2, wherein said normal link comprises separate transmission media for each transmission direction, and said continuity verification is carried out in first and second successive phases where in each phase there is a terminal equipment which initiates the continuity verification procedure, and wherein said terminal equipment initiating the quality verification procedure is not the terminal equipment which initiates said continuity verification procedure in said second of said successive phases.

8. A method according to claim 6 wherein, when continuity of the normal link has been established, the terminal equipment which does not initiate the quality verification procedure, while still using said standby link, is advised of the change from the first stage to the second stage and of transmission on the normal link by the terminal equipment initiating the quality verification procedure 9. A method according to claim 7 wherein, when continuity of the normal link has been established, the terminal equipment which does not initiate the quality verification procedure, while still using said standby link, is advised of the change from the first stage to the second stage and of transmission on the normal link by the terminal equipment initiating the quality verification procedure 10. A method according to claim 7, wherein the standby link is a public switched telephone network link, the terminal equipment initiating the quality verification procedure is a call mode terminal equipment having the initiative for setting up the standby link in the case of malfunctioning of the normal link, and the terminal equipment initiating the continuity verification procedure is a receive mode terminal equipment which is the terminal equipment other than the call mode terminal equipment.

11. A method according to claim 7, wherein the standby link is a public switched telephone network link, the terminal equipment initiating the quality verification procedure is a call mode terminal equipment having the initiative for setting up the standby link in the case of malfunctioning the normal link, and the terminal equipment initiating the continuity verification procedure in said first phase is said call mode terminal equipment and in said second phase is a receive mode terminal equipment which is the terminal equipment other than the call mode terminal equipment.

12. A method according to claim 9, wherein the standby link is a public switched telephone network link, the terminal equipment initiating the quality verification procedure is a call mode terminal equipment having the initiative for setting up the standby link in the case of malfunctioning the normal link, and the terminal equipment initiating the continuity verification procedure in said first phase is the call mode terminal equipment and in said second phase is a receive mode terminal equipment which is the terminal equipment other than the call mode terminal equipment.

13. A method according to claim 1, wherein said normal link comprises separate transmission media for each transmission direction, and said transmitting and detecting steps are performed for each of said separate transmission media.

14. Apparatus for controlling return to a normal link after using a standby link, in a data communication system comprising said normal and standby links between two terminal equipments, wherein said standby link is used in the event of a malfunction of said normal link, each of said terminal equipments including normal link transmit and receive ports and standby link transmit and receive ports and each said terminal equipment further including a data processing device which processes data transmitted and received by its terminal equipment and each data processing device having transmit and receive ports, said apparatus comprising means for preliminarily verifying the continuity of the normal link by simultaneously, in case of said malfunction and once the standby link is used for transmitting data signals to be transmitted between said two terminal equipments, transmitting a data signal from one of said two terminal equipments, referred to hereinafter as the terminal equipment initiating the continuity verification procedure, on the normal link and on the standby link, and detecting at the other terminal equipment the presence or absence of power on the normal link;

said apparatus further comprising, in each of said terminal equipments:

a switching circuit for controlling the connection of the transmit and receive ports of the data processing device of its terminal equipment to at least one of the normal and standby transmit and receive ports of its terminal equipment; and a power sensor connected to the terminal equipment normal link receive port for sensing power on said normal link indicative of continuity of said link.

15. Apparatus according to claim 14 wherein, when continuity of the normal link is established by sensing the presence of power on said normal link, the quality of transmission on said normal link is verified without clearing down said standby link and at the initiative of one of said terminal equipments, referred to herein after as the terminal equipment initiating the quality verification procedure, said apparatus further comprising:

a detector adapted to determine whether signals received by the data processing device via said normal link are received satisfactorily or not; and a switch adapted to open or close the standby link.

16. Apparatus according to claim 14, wherein said normal link includes separate transmission media for each transmission direction between said two terminal equipments, and wherein said continuity verification procedure is performed separately for each of said transmission media.

* * * * *